United States Patent [19]

Takagi et al.

[11] Patent Number: 5,496,885
[45] Date of Patent: *Mar. 5, 1996

[54] THERMOPLASTIC RESIN COMPOSITION AND PROCESS FOR PREPARING THE SAME

[75] Inventors: Kiyoji Takagi; Koji Nishida; Tosio Itou, all of Mie, Japan

[73] Assignee: Mitsubishi Chemical Corporation, Tokyo, Japan

[*] Notice: The term of this patent shall not extend beyond the expiration date of Pat. No. 5,510,776.

[21] Appl. No.: 67,816

[22] Filed: May 27, 1993

[30] Foreign Application Priority Data

Jun. 1, 1992 [JP] Japan .................... 4-140405
Jul. 8, 1992 [JP] Japan .................... 4-181024

[51] Int. Cl.$^6$ .................... C08L 65/02; C08L 67/02; C08L 71/12; C08K 5/03
[52] U.S. Cl. .................... 524/539; 525/92 F; 525/394; 525/397; 525/468; 525/905
[58] Field of Search .................... 524/539; 525/92, 525/397, 905, 394, 468

[56] References Cited

U.S. PATENT DOCUMENTS

| | | | |
|---|---|---|---|
| 4,866,130 | 9/1989 | Brown et al. | 525/92 |
| 4,902,753 | 2/1990 | Brown et al. | 525/394 |
| 5,039,742 | 8/1991 | Brown et al. | 525/68 |
| 5,079,297 | 1/1992 | Brown et al. | 525/92 |
| 5,189,114 | 2/1993 | Brown et al. | 525/394 |
| 5,310,776 | 5/1994 | Takagi et al. | 524/474 |

FOREIGN PATENT DOCUMENTS

| | | |
|---|---|---|
| 0250979 | 1/1988 | European Pat. Off. . |
| 0283837 | 9/1988 | European Pat. Off. . |
| 0306774 | 3/1989 | European Pat. Off. . |
| WO92/15643 | 9/1992 | WIPO . |

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

There are disclosed a thermoplastic resin composition which comprises
  (a) 4 to 95% by weight of a polyphenylene ether,
  (b) 95 to 4% by weight of a saturated polyester,
  (c) 0.5 to 40% by weight of an impact modifier and
  (d) 0.01 to 50% by weight of a compatibilizer and
  (e) 0.1 to 3 parts by weight of a polycarbonate based on 100 parts by weight of the above (a) to (d) in total; and a process for preparing a thermoplastic resin composition which comprises the steps of melting and kneading
  (a) 50 to 95% by weight of a polyphenylene ether,
  (e) 0.1 to 5% by weight of a polycarbonate, and
  (d) 5 to 50% by weight of a compatibilizer and
  (c) 0 to 35 parts by weight of an impact modifier based on 100 parts by weight of the above (a), (e) and (d) in total to obtain an intermediate composition (A), and then, melting and kneading 10 to 80% by weight of the intermediate composition (A) and (b) 90 to 20% by weight of a saturated polyester in a kneader equipped with vent ports each having a vacuum device while maintaining each vent port at a reduced pressure of 200 mmHg or less to prepare a thermoplastic resin composition.

11 Claims, No Drawings

THERMOPLASTIC RESIN COMPOSITION AND PROCESS FOR PREPARING THE SAME

BACKGROUND OF THE INVENTION

This invention relates to a thermoplastic resin composition having an excellent balance between impact resistance and heat resistance, and a process for preparing the same. A polyphenylene ether (hereinafter referred to as "PPE") has been known as engineering plastics having excellent heat resistance, dimensional stability, nonhygroscopicity and electric characteristics, but it has drawbacks that melt fluidity (flowability when melting) is bad to make molding processing difficult, and also solvent resistance and impact resistance are poor.

On the other hand, a saturated polyester has been used widely as engineering plastics having excellent molding processability, solvent resistance and mechanical strength in the fields of parts for automobiles and parts for electric and electronic equipments. However, this resin has drawbacks that molding shrinkage rate and linear expansion coefficient are high, and also rigidity is greatly lowered at high temperature. In order to remove these drawbacks, there has been proposed a method of filling up a reinforcing agent such as glass fiber, but the method has a problem that appearance of a molded product is worsened so that application thereof is limited depending on the field.

If a composition having both good properties of PPE and the saturated polyester and compensating undesirable properties each other can be obtained, an excellent resin material having a wide application field can be provided, and it can be said that industrial significance of such a material is extremely great. Therefore, for the purpose of providing a molding material in which disadvantages of both resins are compensated each other without impairing advantages thereof, there have been disclosed, for example, compositions in which both resins are simply melted and mixed in Japanese Patent Publication No. 21664/1976 and Japanese Provisional Patent Publications No. 50050/1974, No. 75662/1974 and No. 159847/1984.

However, in such a simple blend system, PPE and the saturated polyester have inherently poor compatibility with each other so that adhesiveness at an interface of this two phase structure is not good, whereby two phases can hardly take uniform and fine forms. Therefore, when shear stress is applied to molding processing such as injection molding, laminar peeling (delamination) is easily caused, whereby appearance of a resulting molded product is worsened and an interface of two phases becomes a defective portion. Thus, it is impossible to obtain a composition having excellent mechanical characteristics such as dimensional stability, heat resistance and rigidity and excellent physical characteristics such as solvent resistance.

Therefore, there have been proposed several techniques of improving compatibility of both resins. There have been disclosed, for example, a method of using a modified PPE obtained by reacting a compound having both (i) a carbon-carbon double bond or a carbon-carbon triple bond and (ii) one or more selected from a carboxylic acid, an acid anhydride, an acid amide, an epoxy group and a hydroxyl group (Japanese Provisional Patent Publications No. 257958/1987 and No. 54427/1988 and PCT Provisional Patent Publication No. 500803/1988), a method of using an alkoxysilyl group-modified PPE (PCT Provisional Patent Publication No. 503392/1988), a method of using an oxazoline-modified PPE (Japanese Provisional Patent Publication No. 187453/1990), a method of using a polyester modified with a hydroxyl group- or carboxyl group-terminated polystyrene (Japanese Provisional Patent Publication No. 170852/1990), a method of formulating oxycarboxylic acids (Japanese Provisional Patent Publication No. 129259/1990) and a method of formulating a modified resin obtained by subjecting an epoxy compound to graft polymerization with a hydrogenated block copolymer comprising a vinyl aromatic polymer and a diene polymer (Japanese Provisional Patent Publication No. 128068/1988). However, even when these methods are used, compatibility of PPE and the saturated polyester cannot be improved sufficiently in many cases, and it cannot be said that mechanical characteristics of resulting compositions are sufficient. Thus, further improvement has been demanded.

SUMMARY OF THE INVENTION

An object of the present invention is to provide a thermoplastic resin composition in which miscibility or compatibility of PPE and a saturated polyester is extremely excellent so that both components exhibit a uniform and fine miscible or compatible state, thereby inhibiting laminar peeling formed when shear stress is applied during molding processing such as injection molding and making a PPE dispersed particle size fine, and impact resistance of a resulting molded product is excellent and also heat resistance and rigidity are excellent.

The present inventors have studied intensively in order to solve the above problems, and consequently found that a resin composition prepared by melting and kneading a resin in which PPE, a saturated polyester, an impact modifier and a compatibilizer are formulated at a specific ratio and a polycarbonate is a composition having an excellent balance between impact resistance and heat resistance, to accomplish the present invention.

That is, the present invention is a thermoplastic resin composition which comprises (a) 4 to 95% by weight of a polyphenylene ether, (b) 95 to 4% by weight of a saturated polyester, (c) 0.5 to 40% by weight of an impact modifier and (d) 0.01 to 50% by weight of a compatibilizer and (e) 0.1 to 3 parts by weight of a polycarbonate based on 100 parts by weight of the above (a) to (d) in total.

Also, a process for preparing a thermoplastic resin composition of the present invention comprises the steps of melting and kneading (A)

(a) 50 to 95% by weight of a polyphenylene ether, (e) 0.1 to 5% by weight of a polycarbonate, and (d) 5 to 50% by weight of a compatibilizer and (c) 0 to 35 parts by weight of an impact modifier based on 100 parts by weight of the above (a), (e) and (d) in total to obtain an intermediate composition (A), and then, melting and kneading 10 to 80% by weight of the intermediate composition (A) and (b) 90 to 20% by weight of a saturated polyester in a kneader equipped with vent ports each having a vacuum device while maintaining each vent port at a reduced pressure of 200 mmHg (26664.4 Pa) or less to prepare a thermoplastic resin composition.

DESCRIPTION OF THE PREFERRED EMBODIMENTS

In the composition of the present invention, it is not certain whether or not the above respective components cause chemical interaction when they are blended. Thus, the present invention includes a composition comprising other optional components described below, the above respective components and a reaction product of these components.

In the following, the present invention is described in detail.

<PPE (a)>

PPE (a) to be used in the present invention is a homopolymer or copolymer having a structure represented by the formula:

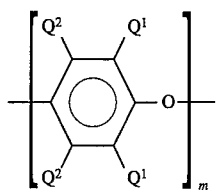

wherein $Q^1$s each represent a halogen atom, a primary or secondary alkyl group, an aryl group, a haloalkyl group, an aminoalkyl group, a hydrocarbonoxy group or a halohydrocarbonoxy group; $Q^2$s each represent a hydrogen atom, a halogen atom, a primary or secondary alkyl group, an aryl group, a haloalkyl group, a hydrocarbonoxy group or a halohydrocarbonoxy group; and m represents an integer of 10 or more.

As a preferred example of the primary alkyl group represented by $Q^1$ or $Q^2$, there may be mentioned methyl, ethyl, n-propyl, n-butyl, n-amyl, isoamyl, 2-methylbutyl, n-hexyl, 2,3-dimethylbutyl, 2-, 3- or 4-methylpentyl or heptyl. As a preferred example of the secondary alkyl group, there may be mentioned isopropyl, sec-butyl or 1-ethylpropyl. In many cases, $Q^1$ is an alkyl group or an aryl group, particularly an alkyl group having 1 to 4 carbon atoms, and $Q^2$ is a hydrogen atom.

As a preferred homopolymer of PPE, there may be mentioned, for example, a homopolymer comprising a 2,6-dimethyl-1,4-phenylene ether unit. As a preferred copolymer, there may be mentioned a random copolymer comprising a combination of the above unit and a 2,3,6-trimethyl-1,4-phenylene ether unit. A number of preferred homopolymers or random copolymers are described in patent specifications and literatures. For example, PPE having a molecular structure portion which improves characteristics such as molecular weight, melt viscosity and/or impact resistant strength is also preferred.

PPE (a) to be used in the present invention preferably has an intrinsic viscosity measured at 30° C. in chloroform of 0.2 to 0.8 dl/g, more preferably an intrinsic viscosity of 0.2 to 0.6 dl/g, particularly preferably an intrinsic viscosity of 0.25 to 0.5 dl/g. If the intrinsic viscosity is less than 0.2 dl/g, impact resistance of a composition is insufficient, while if it exceeds 0.8 dl/g, moldability of a composition and appearance of a molded product are not satisfactory.

<Saturated polyester (b)>

As the saturated polyester (b) to be used in the present invention, various polyesters can be used.

As one example thereof, there may be mentioned a thermoplastic polyester prepared by condensing a dicarboxylic acid or a lower alkyl ester thereof, an acid halide or an acid anhydride derivative and a glycol or a divalent phenol according to a conventional method.

As a specific example of an aromatic or aliphatic dicarboxylic acid suitable for preparing the above polyester, there may be mentioned oxalic acid, malonic acid, succinic acid, glutaric acid, adipic acid, suberic acid, azelaic acid, sebacic acid, terephthalic acid, isophthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid or 2,7-naphthalenedicarboxylic acid, or a mixture of these carboxylic acids.

As an aliphatic glycol suitable for preparing the above polyester, there may be exemplified a straight alkylene glycol having 2 to 12 carbon atoms, for example, ethylene glycol, 1,3-propylene glycol, 1,4-butanediol, 1,6-hexanediol or 1,12-dodecamethylene glycol. As an aromatic glycol compound, there may be exemplified p-xylylene glycol, and as a divalent phenol, there may be exemplified pyrocatechol, resorcinol, hydroquinone or alkyl-substituted derivatives of these compounds. Other suitable glycols may include 1,4-cyclohexanedimethanol.

As other preferred polyesters, there may be mentioned a polyester obtained by ring opening polymerization of a lactone, for example, polypivalolactone and poly(ε-caprolactone).

Further, as other preferred polyesters, there may be mentioned a thermotropic liquid crystal polymer (TLCP) which forms liquid crystal in a melt state. As a representative TLCP which is commercially available, there may be mentioned X7G (trade name) produced by Eastman Kodak Co., Xydar (trade name) produced by Datoco Co., Ekonol (trade name) produced by Sumitomo Kagaku Co. and Vectra (trade name) produced by Celanese Co.

Among the saturated polyesters (b) described above, polyethylene terephthalate (PET), polybutylene terephthalate (PBT), polynaphthalene terephthalate (PEN), poly(1,4-cyclohexanedimethylene terephthalate)(PCT) and a liquid crystal polyester are saturated polyesters preferably used in the thermoplastic resin composition of the present invention.

The saturated polyester (b) to be used in the present invention has an intrinsic viscosity measured at 20° C. in a mixed solution of phenol/1,1,2,2-tetrachloroethane=60/40% by weight preferably of 0.5 to 5.0 dl/g, more preferably 1.0 to 4.0 dl/g, particularly preferably 1.5 to 3.5 dl/g. If the intrinsic viscosity is less than 0.5 dl/g, impact resistance is insufficient, while if it exceeds 5.0 dl/g, moldability is not satisfactory.

<Impact modifier (c)>

As the impact modifier (c), an elastomer is used. If the elastomer has too high modulus of tension, it does not function as an impact modifier sufficiently so that the modulus of tension of the elastomer is preferably 5,000 kg/cm² (ASTM D882) or less, more preferably 3,500 kg/cm² or less. As the elastomer, there may be included natural rubber or diene type synthetic rubber such as polybutadiene and polyisoprene, or a copolymer of such a diene and a vinyl monomer including a vinyl aromatic monomer such as styrene.

Specific examples may include a terpolymer of styrene-butadiene-styrene or a hydride (hydrogenated product) thereof; polybutadiene and polychlorobutadiene such as neoprene; a copolymer of isobutylene and butadiene or isoprene; polyisoprene; a copolymer of ethylene and propylene or a copolymer of ethylene and butadiene; polysulfated rubber; acrylic rubber; and polyurethane rubber.

Also, those in which these elastomers are subjected to graft polymerization with an α, β-unsaturated dicarboxylic acid such as maleic acid, monomethyl maleate, maleic anhydride, itaconic acid, monomethyl itaconate, itaconic anhydride and fumaric acid, an alicyclic carboxylic acid such as end-bicyclo[2.2.1]-5-hepten-2,3-carboxylic acid or a derivative thereof, or an epoxy-containing vinyl monomer such as glycidyl methacrylate and glycidyl acrylate by utilizing a peroxide, ionized radiation or UV rays may be used.

<Compatibilizer (d)>

As the compatibilizer (d) to be used in the present invention, there may be mentioned a polyfunctional non-rubbery compound and/or polymer which interact(s) with PPE, the saturated polyester or both of them chemically, for example, by graft reaction and/or blocking reaction, or physically, for example, by changing interface characteristics of dispersed phases and/or heightening phase dispersion, to improve compatibility of a resin mixture so as to be shown by impact strength, stretchability (elongation) and weld line strength which are particularly heightened as a result of the interaction. A number of compatibilizers suitable for a blend of PPE and the saturated polyester have been well known as described above, and further other compatibilizers have been confirmed as a PPE and saturated polyester system has been more clarified. Such compatibilizers are all within the scope of the present invention.

Examples of the compatibilizer (d) are those shown below.

(i) Hydroxyalkylated PPE (ii) Polyhydroxyphenylene ether having an alcoholic hydroxyl group in side chain (iii) Compound having both of an unsaturated group and a polar group in the same molecule (iv) Resin obtained by graft polymerizing an epoxy-containing vinyl monomer to a hydrogenated product of a block copolymer comprising a vinyl aromatic compound polymer block and a conjugated diene polymer block.

The hydroxyalkylated PPE (i) to be used in the present invention is a PPE in which an alcoholic hydroxyl group is added to a terminal phenolic hydroxyl group by a modifier, and can be obtained by, for example, the following methods which have been invented and applied for patent by some of the present inventors, specifically a method in which PPE and a modifier are reacted at 50° to 200° C. by using a basic catalyst in the presence or absence of an organic solvent which can solve PPE.

(A) A method in which the PPE (I) is reacted with glycidol represented by the formula:

(III$_A$)

to prepare a hydroxyalkylated PPE represented by the formula:

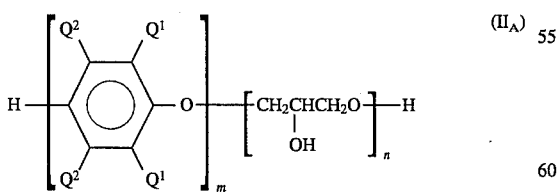
(II$_A$)

wherein $Q^1$, $Q^2$ and m each have the same meanings as defined above; and n represents an integer of 1 to 10 (Japanese Provisional Patent Publication No. 250025/1991).

(B) A method in which the PPE (I) is reacted with epihalohydrin represented by the formula:

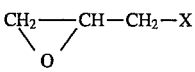
(III$_B$)

wherein X represents a halogen atom, such as epichlorohydrin, and then the resulting terminal glycidyl-modified PPE is hydrolyzed to prepare a hydroxy-alkylated PPE represented by the formula:

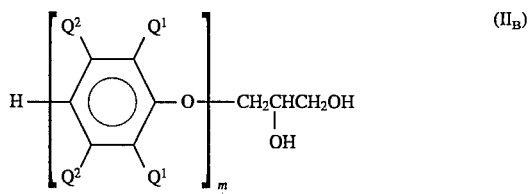
(II$_B$)

wherein $Q^1$, $Q^2$ and m each have the same meanings as defined above
(Japanese Provisional Patent Publication No. 250025/1991).

(C) A method in which the PPE (I) is reacted with a halogenated alkyl alcohol represented by the formula:

$X$-$R^1$-$OH$ (III$_C$)

wherein $R^1$ represents an alkylene group having 1 to 10 carbon atoms; and X has the same meaning as defined above, such as 2-chloroethanol and 3-chloro-1-propanol to prepare a hydroxyalkylated PPE represented by the formula:

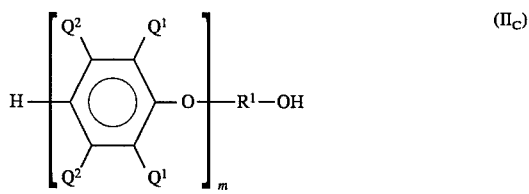
(II$_C$)

wherein $Q^1$, $Q^2$, m and $R^1$ each have the same meanings as defined above
(Japanese Provisional Patent Publication No. 292326/1991)o (D) A method in which the PPE (I) is reacted with an alkylene carbonate represented by the formula:

(III$_D$)

wherein $R^2$ represents a hydrogen atom or an alkyl group having 1 to 8 carbon atoms, such as ethylene carbonate and propylene carbonate to prepare a hydroxyalkylated PPE represented by the formula:

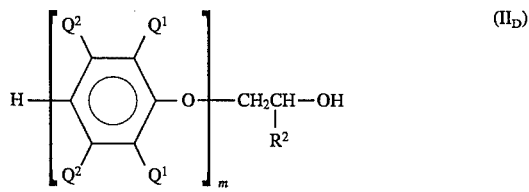
(II$_D$)

wherein $Q^1$, $Q^2$, m and $R^2$ each have the same meanings as defined above
(Japanese Provisional Patent Publication No. 250027/1991).

(E) A method in which the PPE (I) is reacted with an alkylene oxide represented by the formula:

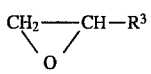 (III$_E$)

wherein $R^3$ represents a hydrogen atom or an alkyl group having 1 to 8 carbon atoms, such as ethylene oxide and propylene oxide to prepare a hydroxyalkylated PPE represented by the formula:

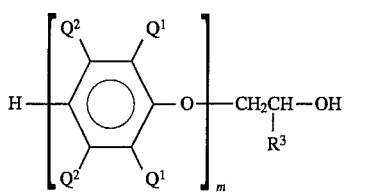 (II$_E$)

wherein $Q^1$, $Q^2$, m and $R^3$ each have the same meanings as defined above
(Japanese Provisional Patent Publication No. 128021/1988).

The organic solvent to be used in these reactions may include an aromatic hydrocarbon such as benzene, toluene and xylene; a halogenated hydrocarbon such as chloroform and carbon tetrachloride; a halogenated aromatic hydrocarbon such as chlorobenzene and dichlorobenzene; and a heterocyclic compound such as N-methyl-2-pyrrolidone and 1,3-dimethyl-2-imidazolidinone.

As the basic catalyst, there may be mentioned an alcoholate such as sodium methoxide and sodium ethoxide; an alkali metal hydroxide such as sodium hydroxide and potassium hydroxide; and an alkali metal carbonate such as sodium carbonate and potassium carbonate.

The ratio of PPE and the modifier to be used in these reactions is 1 to 50 mole of the modifier based on 1 mole of the terminal phenolic hydroxyl group of PPE, and the amount of the basic catalyst to be used is 0.5 to 50 parts by weight based on 100 parts by weight of PPE.

In the present invention, among the hydroxyalkylated PPEs (II$_A$) to (II$_E$) obtained by the methods (A) to (E) described above, (II$_A$) or (II$_B$) having two or more alcoholic hydroxyl groups with different reaction activities and reactivities is preferred, and (II$_A$) is particularly preferred.

The polyhydroxyphenylene ether having an alcoholic hydroxyl group in the side chain (ii) to be used in the present invention is a resin having, as a skeleton, a PPE obtained by polymerizing or copolymerizing 0.2 to 100 mole % of at least one phenol derivative having a hydroxyl group represented by the formula:

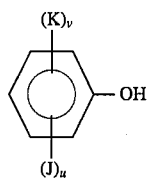 (IV)

wherein u represents an integer of 1 to 4; v represents an integer of 0 to 3; $u+v \leq 4$; J represents $-R^5-(OH)_t$, where $R^5$ represents an aliphatic polyvalent hydrocarbon group or aromatic polyvalent hydrocarbon group having 1 to 20 carbon atoms which may be interrupted by an oxygen atom or have a substituent(s) in the side chain and t represents an integer of 1 to 6; when u is 2 or more, Js may be the same or different; K represents a hydrogen atom, a halogen atom, a primary or secondary alkyl group having 1 to 20 carbon atoms, a haloalkyl group having 1 to 20 carbon atoms or a hydrocarbonoxy group or halohydrocarbonoxy group having 1 to 20 carbon atoms; and when v is 2 or more, Ks may be the same or different, and 99.8 to 0 mole % of at least one phenol substituent represented by the formula:

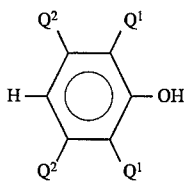 (V)

wherein $Q^1$ and $Q^2$ each have the same meanings as defined above.

The compound having both of an unsaturated group and a polar group in the same molecule (iii) to be used in the present invention is a compound having an unsaturated group, i.e. a carbon-carbon double bond or a carbon-carbon triple bond and a polar group, i.e. a functional group which shows affinity to or chemical reactivity with an ester bond contained in the saturated polyester or a carboxyl group or a hydroxyl group existing at the terminal of the chain, in the same molecule in combination. Examples of such a polar group may include an epoxy group, a carboxyl group, various salts or acid anhydrides derived from a carboxyl group, a hydroxyl group, oxazoline, an amino group, nitrile, ester, imide and acid azide.

As a specific example of the compound (iii), preferred are glycidyl methacrylate and glycidyl acrylate, and more preferred is a compound having both a glycidyloxy group and a (meth)acrylamide group in the same molecule, an epoxidized liquid polybutadiene having 0.07% by weight or more of oxirane oxygen, a copolymer of ethylene and glycidyl methacrylate, having 1% by weight or more of a glycidyl group, or a terpolymer of ethylene, glycidyl methacrylate and a third component monomer which is copolymerizable with ethylene, having 1% by weight or more of a glycidyl group.

The compound having both a glycidyloxy group and a (meth)-acrylamide group in the same molecule is represented by the formula:

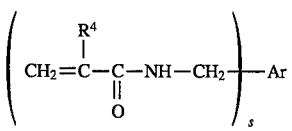 (VI)

wherein Ar represents an aromatic hydrocarbon group with 6 to 20 carbon atoms having at least one glycidyloxy group; $R^4$ represents a hydrogen atom or a methyl group; and s represents an integer of 1 to 4.

Examples of such a compound may include a compound represented by the formula:

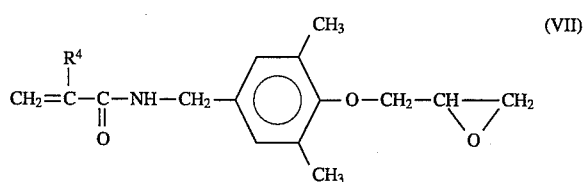 (VII)

wherein $R^4$ has the same meaning as defined above, a compound represented by the formula:

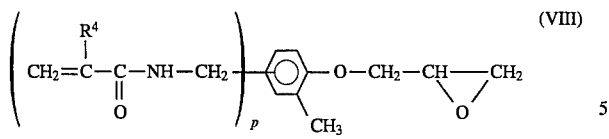

(VIII)

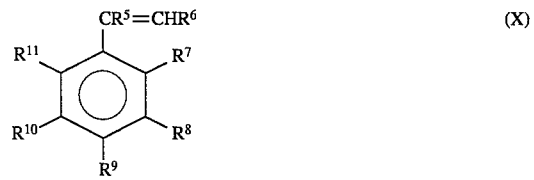

(X)

wherein $R^4$ has the same meaning as defined above; and p represents an integer of 1 or 2, or a compound represented by the formula:

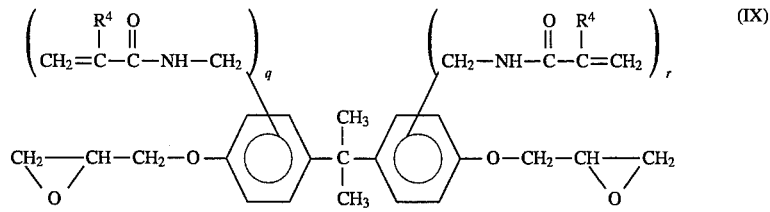

(IX)

wherein $R^4$ has the same meaning as defined above; and q and r each represent an integer of 0 to 2 and at least one of q and r is 1 or more.

Among them, preferred is a compound represented by the formula (VII) wherein $R^4$ is a hydrogen atom.

The epoxidized liquid polybutadiene is a liquid polybutadiene epoxidized by adding an oxygen atom to an ethylene bond thereof, and preferably has an oxirane oxygen amount of 0.07% by weight or more and a weight average molecular weight of 500 to 10,000.

The oxirane oxygen means an oxygen bonded to an ethylene bond, and the oxirane oxygen amount is % by weight of the oxirane oxygen based on the molecular weight of the epoxidized liquid polybutadiene. Any microstructure of a double bond in the epoxidized liquid polybutadiene, i.e. a vinyl group, a trans-1,4 structure and a cis-1,4 structure with any ratio, is included in the scope of the present invention. The oxirane oxygen amount of the epoxidized liquid polybutadiene to be used in the present invention is preferably 0.07% by weight or more. If the amount is less than 0.07% by weight, impact resistant strength is insufficient.

A copolymer of ethylene and glycidyl methacrylate or a terpolymer with a third component which is copolymerizable with ethylene may be also used. The copolymer or terpolymer having 1% by weight or more of a glycidyl group is particularly preferred.

The modified resin (iv) to be used in the present invention is obtained by subjecting a hydrogenated block copolymer comprising a vinyl aromatic compound polymer block (x) and a conjugated diene polymer block (y) to graft polymerization with an epoxy-containing vinyl monomer. The hydrogenated block copolymer is a block copolymer in which aliphatic unsaturated groups of the chain block (y) derived from conjugated diene of a vinyl aromatic compound-conjugated diene block copolymer having a structure comprising at least one chain block (x) derived from a vinyl aromatic compound and at least one chain block (y) derived from conjugated diene are reduced by hydrogenation. The sequence of the blocks (x) and (y) may include a linear structure and a branched structure (radical tereblock). In a part of these structures, a random chain derived from a random copolymer portion of a vinyl aromatic compound and conjugated diene may be included. Among the sequences, preferred is a sequence having a linear structure, and more preferred is a sequence having a diblock structure. The vinyl aromatic compound which forms the block (x) has a chemical structure represented by the following formula:

wherein $R^5$ and $R^6$ are selected from the group consisting of a hydrogen atom, an alkyl group having 1 to 6 carbon atoms and an alkenyl group; $R^7$ and $R^8$ are selected from the group consisting of a hydrogen atom, an alkyl group having 1 to 6 carbon atoms, a chlorine atom and a bromine atom, respectively; and $R^9$, $R^{10}$ and $R^{11}$ are selected from the group consisting of a hydrogen atom and an alkyl group having 1 to 6 carbon atoms and an alkenyl group, or $R^{10}$ and $R^{11}$ may be linked with a hydrocarbyl group to form a naphthyl group.

The vinyl aromatic compound (X) is preferably styrene, α-methylstyrene, paramethylstyrene, vinyl toluene or vinyl xylene, more preferably styrene.

The conjugated diene is preferably 1,3-butadiene or 2-methyl-1,3-butadiene.

The ratio of the recurring unit derived from the vinyl aromatic compound in the hydrogenated vinyl aromatic compound-conjugated diene block copolymer is preferably 10 to 80% by weight, more preferably 15 to 60% by weight.

In the aliphatic chain portions of these block copolymers, the ratio of unsaturated bonds derived from the conjugated diene and not hydrogenated to remain as such is preferably 20% or less, more preferably 10% or less. Further, about 25% or less of aromatic unsaturated bonds derived from the vinyl aromatic compound may be hydrogenated.

As a measure of the molecular weights of these hydrogenated block copolymers, a viscosity value in a toluene solution is preferably 30,000 to 10 cP, more preferably 10,000 to 30 cP (concentration: 15% by weight). If the value exceeds 30,000 cP, molding processability of a final composition is not satisfactory, while if it is less than 10 cP, a mechanical strength level of a final composition is undesirably low.

Next, as an example of the epoxy-containing vinyl monomer to be subjected to graft polymerization with the hydrogenated block copolymer described above, there may be mentioned a compound having a glycidyl group and a (meth)acrylate group in the same molecule, a compound having a glycidyloxy group and an acrylamide group in the same molecule, an unsaturated monomer having an alicyclic epoxy group and butylglycidyl maleate. Preferred is a compound having an alicyclic epoxy group and a (meth)acrylate group in the same molecule or a compound having a glycidyloxy group and an acrylamide group in the same molecule. As the compound having an alicyclic epoxy group and a (meth)acrylate group in the same molecule, there may be mentioned, for example, a compound represented by the formula (XI) or the formula (XII):

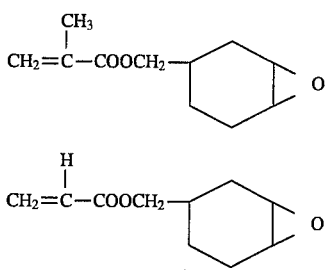

and as the compound having a glycidyloxy group and an acrylamide group in the same molecule, there may be mentioned the compound represented by the above formula (VI).

As the graft polymerization method, there may be used a method in which graft polymerization is carried out by melting and kneading a hydrogenated block copolymer and an epoxy-containing vinyl monomer in the presence of a radical polymerization initiator by using a kneading extruder and a method in which graft polymerization is carried out by dispersing a hydrogenated block copolymer in an aromatic hydrocarbon solvent such as toluene, xylene, chlorobenzene and benzene in which a radical polymerization initiator is dissolved, supplying an epoxy-containing monomer to the dispersion and heating the mixture.

The radical polymerization initiator may be any conventional radical initiator, and includes an organic peroxide and azonitrile.

In the polymer thus obtained, the epoxy-containing vinyl monomer is subjected to graft polymerization at a ratio of 0.1 to 10% by weight.

The compatibilizer (d) to be used in the present invention may be used singly or in combination of two or more.

<Polycarbonate (e)>

As the polycarbonate (e) to be used in the present invention, there may be mentioned an aromatic polycarbonate, an aliphatic polycarbonate and an aliphatic-aromatic polycarbonate. Among them, preferred are aromatic polycarbonates comprising 2,2-bis(4-oxyphenyl)alkane type, bis(4-oxyphenyl)ether type, bis(4-oxyphenyt)sulfone and sulfide or sulfoxide type bisphenols. If necessary, a polycarbonate comprising bisphenols substituted by halogens may be used.

The weight average molecular weight of the polycarbonate (e) is preferably 3,000 to 40,000, more preferably 5,000 to 30,000, particularly preferably 8,000 to 20,000.

<Composition ratio of constitutional components>

The composition ratio of Components (a) to (d) described above with the total weight of (a), (b), (c) and (d) being 100% by weight is shown below.

Component (a): 4 to 95% by weight, preferably 5 to 70% by weight, particularly preferably 10 to 55% by weight. If the ratio of Component (a) is less than 4% by weight, heat resistance is insufficient, while if it exceeds 95% by weight, solvent resistance and impact resistance are insufficient.

Component (b): 95 to 4% by weight, preferably 90 to % 30 by weight, particularly preferably 80 to 45% by weight. If the ratio of Component (b) is less than 4% by weight, solvent resistance and impact resistance are insufficient, while if it exceeds 95% by weight, heat resistant rigidity is insufficient.

Component (c): 0.5 to 40% by weight, preferably 3 to 30% by weight, particularly preferably 7 to 20% by weight. If the ratio of Component (c) exceeds 40% by weight, heat resistance is insufficient.

Component (d): 0.01 to 50% by weight, preferably 0.5 to 40% by weight, particularly preferably 1 to 35% by weight. If the ratio of Component (d) exceeds 50% by weight, solvent resistance, impact resistance and appearance are insufficient.

As a formulation ratio of Component (e), its amount to be added based on 100 parts by weight in total of (a) to (d) is 0.1 to 3 parts by weight, preferably 0.5 to 2.5 parts by weight, particularly preferably 1 to 2 parts by weight. If the ratio of Component (e) is less than 0.1 part by weight, impact resistance is insufficient, while if it exceeds 3 parts by weight, impact resistance and heat resistance are insufficient.

<Additional components>

To the thermoplastic resin composition of the present invention, other additional components may be added. For example, as additional components, additives such as an antioxidant, a weatherability-improving agent, a nucleating agent and a flame retardant which have been conventionally known may be used in the saturated polyester; and an antioxidant, a weatherability-improving agent, a plasticizer and a fluidity-improving agent which have been conventionally known may be used in PPE. As an aid of compatibilizing the saturated polyester and PPE, there may be also used a phase transfer catalyst such as tetrabutylammonium bromide and tetrabutylphosphonium bromide or an organic metal catalyst such as titanium tetra(2-ethylhexyloxide) and titanium tetrabutoxide. Further, it is effective for improving rigidity, heat resistance or dimensional stability to add an organic or inorganic filler, a reinforcing agent, particularly glass fiber, mica, talc, wallastonite, potassium titanate, calcium carbonate or silica. Various coloring agents and dispersants thereof which have been conventionally known may be used for practical use.

<Preparation and molding method of composition>

As a melting and kneading machine for obtaining the thermoplastic resin composition of the present invention, a kneader generally used for a thermoplastic resin may be suitably used so long as it has vent ports. For example, a single axis or plural axis kneading extruder, a roll mixer and a Banbury mixer may be included.

The vent ports should be maintained at reduced pressure so that it is required that the resin in a kneader is partially melted at a front portion of each vent port to effect reduced pressure sealing. Further, when the resin in a kneader is stored in a melted state for a long time before reaching the vent port, impact resistance is lowered. Therefore, the resin is preferably melted immediately before reaching the vent port as far as possible. Performances of a vacuum device to be linked directly to the vent port may be selected depending on the reduced pressure degree of the vent port, and a type thereof may be optional.

The reduced pressure degree of the vent port is preferably maintained at 200 mmHg or less. If it is more than 200 mmHg, compatibility of PPE and the saturated polyester is worsened (domain dispersed particle size: large), and impact resistance is insufficient. The reduced pressure degree is more preferably 100 mmHg or less, particularly preferably 50 mmHg or less.

As to kneading order, all components may be kneaded simultaneously, or kneading may be carried out by using a previously kneaded blend. Further, kneading may be carried out by feeding the respective components in order from several feeding ports provided midway in an extruder.

<Composition of intermediate composition (A)>

In the present invention, preferred is a method in which Component (a), Component (d) and Component (e) are previously melted and kneaded to prepare an intermediate composition (A), and then the intermediate composition (A), Component (b) and Component (c) are melted and kneaded to prepare a final composition, and more preferred is a method in which Component (a), Component (c), Component (d) and Component (e) are previously melted and kneaded to prepare an intermediate composition (A), and then the intermediate composition (A) and Component (b) are melted and kneaded to prepare a final composition. That is, Components (a), (e) and (d) are formulated at a ratio shown below based on 100% by weight of the intermediate composition (A).

The formulation ratio of the respective components are as shown below.

Component (a): 50 to 95% by weight, preferably 60 to 94% by weight, particularly preferably 80 to 93% by weight. If the ratio of Component (a) is less than 50% by weight, heat resistance of a final composition is insufficient, while if it exceeds 95% by weight, impact resistance of a final composition is insufficient.

Component (e): 0.1 to 5% by weight, preferably 0.5 to 3.5% by weight, particularly preferably 1 to 3% by weight If the ratio of Component (e) is less than 0.1% by weight, impact resistance of a final composition is insufficient, while if it exceeds 5% by weight, heat resistance and impact resistance of a final composition are insufficient.

Component (d): 5 to 50% by weight, preferably 6 to 40% by weight, particularly preferably 7 to 30% by weight. If the ratio of Component (d) is less than 5% by weight, compatibility and impact resistance of a final composition are insufficient, while if it exceeds 50% by weight, heat resistance, solvent resistance and appearance of a molded product are insufficient.

To the intermediate composition (A), there may be added other additional components than the essential components (a), (e) and (d) described above, for example, an impact modifier (c) as mentioned above, various stabilizers, a fluidity-controlling agent, an inorganic or organic filler, a reinforcing agent, a flame retardant, an antistatic agent and a releasing agent within the range which does not impair the effect of the present invention, if necessary.

The ratio of the impact modifier (c) to be formulated is 0 to 35 parts by weight, preferably 0.5 to 3.5 parts by weight, particularly preferably 1 to 10 parts by weight based on 100 parts by weight of the above components (a), (e) and (d).

<Preparation process of intermediate composition (A)>

The intermediate composition (A) can be obtained by melting and kneading the above components formulated at a specific ratio. First, all of the respective components are mixed by using a Henschel mixer, a super mixer, a ribbon blender or a V blender, and then the mixture is melted and kneaded by using a single axis or plural axis type extruder, a roll mixer or a Banbury mixer. The melding and kneading temperature is generally 200° to 350° C.

As to kneading order, all components may be kneaded simultaneously, or kneading may be carried out by using a previously kneaded blend. Further, kneading may be carried out by feeding the respective components in solid states or melt states in order from midway in an extruder.

The intermediate composition (A) may be used as such in a melt state, pelletized, or pelletized, powdered by pulverization and dried for preparing a final composition.

<Composition ratio of constitutional components>

The intermediate composition (A) and the saturated polyester (b) in the second step are formulated at a ratio shown below.

Intermediate composition (A): 10 to 80% by weight, preferably 15 to 75% by weight, particularly preferably 20 to 65% by weight. If the ratio of Component (A) is less than 10% by weight, heat resistance is insufficient, while if it exceeds 80% by weight, solvent resistance and impact resistance are insufficient.

Saturated polyester (b): 20 to 90% by weight, preferably 25 to 85% by weight, particularly preferably 35 to 80% by weight. If the ratio of Component (b) is less than 20% by weight, solvent resistance and impact resistance are insufficient, while if it exceeds 90% by weight, heat resistant rigidity is insufficient.

A molding processing method of the thermoplastic resin composition of the present invention is not particularly limited, and there may be suitably used a molding method generally used for a thermoplastic resin, i.e. a molding method such as injection molding, blow molding, extrusion molding, sheet molding, thermal molding, rotary molding, lamination molding and press molding.

EXAMPLES

The present invention is described in detail by referring to Examples.

EXAMPLES 1 to 5

The following respective components were used.

Component (a): PPE (a-1): poly(2,6-dimethyl-1,4-phenylene ether)(intrinsic viscosity measured at 30° C. in chloroform: 0.30 dl/g) produced by way of trial by Nippon Polyether Co. was used.

(a-2): poly(2,6-dimethyl-1,4-phenylene ether)(intrinsic viscosity measured at 30° C. in chloroform: 0.42 dl/g) produced by way of trial by Nippon Polyether Co. was used.

Component (b): Saturated polyester

Polybutylene terephthalate (PBT) PBT128 (trade name) produced by Kanebo Co. was used.

Component (c): Impact modifier

Hydrogenated styrene-butadiene block copolymers (SEBS) Kraton G1651 (trade name, styrene content: 33% by weight) and Kraton G1652 (trade name, styrene content: 28% by weight) each produced by Shell Chemical Co. were used.

Component (d): Compatibilizer

Hydroxyalkylated PPE:

To 500 g of a PPE (intrinsic viscosity: 0.29 dl/g) was added 5 liter of toluene, and PPE was dissolved completely by stirring the mixture under nitrogen atmosphere at 100° C. To the solution, 500 ml of ethanol in which 75 g of sodium ethoxide as a catalyst had been previously dissolved was added, and then 250 g of glycidol was added dropwise. The mixture was stirred at 100° C. for 5 hours. The reaction mixture was poured into 25 liter of methanol to precipitate the resulting hydroxyalkylated PPE. The resulting product was collected by filtration, washed twice with methanol and dried by heating at 80° C. under reduced pressure. The resulting hydroxyalkylated PPE was used.

The hydroxyalkylated PPE showed absorption based on a hydroxyl group at around 3,380 $cm^1$ of its infrared absorption spectrum. When terminal phenolic hydroxyl groups were quantitated, 74% of them reacted, whereby it was confirmed that 26% of unreacted PPE was contained.

The reaction degree of the terminal phenolic hydroxyl group of the PPE was calculated by quantitating the terminal phenolic hydroxyl groups before reaction and after reaction according to the method described in "Journal of Applied Polymer Science: Applied Polymer Symposium", Vol. 34, pp. 103 to 117 (1987).

Also, epoxidized liquid polybutadiene BF-1000 (trade name, produced by Adeca Argas Co.) having an oxirane oxygen amount of 7.5% by weight and a molecular weight of about 1,000 and an epoxydized acrylamide compound Kaneka AXE (trade name) produced by Kanegafuchi Kagaku Kogyo Co. were used.

As compatibilizing aids, commercially available tetrabutylphosphonium bromide Aldrich (trade name, produced by Aldrich Co.) and commercially available titanium tetra(2-ethylhexyloxide) TOT (trade name, produced by Wako) were used.

Component (e): Polycarbonate

A polycarbonate Upiron H-3000 (trade name) produced by Mitsubishi Gas Kagaku Co. was used The components to be added to the first hopper shown in Table 1 were sufficiently mixed by stirring using a super mixer according to the formulation ratios shown in Table 1. Then, the mixtures were charged into a TEX 44 biaxis extruder (trade name) manufactured by Nippon Seikosho Co. from the first hopper (the most upper stream of the extruder), and melted and kneaded under conditions of a setting temperature of 210° C. and a screw rotary number of 150 rpm. In the same manner, the components to be added to the second hopper were sufficiently mixed by stirring using a super mixer according to the formulation ratios shown in Table 1. The mixtures were charged into the extruder from the second hopper located downstream from the first kneading portion. The resulting mixtures were melted and kneaded under a reduced pressure condition of 10 mmHg from a vent port located downstream from the second hopper to prepare compositions. The compositions were pelletized.

The respective pellets of the above resin compositions were subjected to injection molding by using an inline screw type injection molding machine IS-90B Model (trade name, manufactured by Toshiba Kikai Seisakusho Co.) at a cylinder temperature of 260° C. and a mold cooling temperature of 80° C. to prepare test pieces.

At injection molding, drying was carried out until immediately before injection molding by using a reduced pressure dryer under conditions of 0.1 mmHg and 80° C. for 48 hours. The injection molded test pieces were placed in a desiccator immediately after molding and allowed to stand at 23° C. for 4 to 6 days, and then evaluation tests were conducted. The results are shown in Table 2.

EXAMPLE 6

Procedures were carried out in the same manner as in Example 1 except for charging all components from the first hopper. The formulation ratio and the test results are shown in Table 1 and Table 2.

Comparative Example 1

Procedures were carried out in the same manner as in Example 6 except for not formulating the polycarbonate (e). The formulation ratio and the test results are shown in Table 1 and Table 2.

Comparative Example 2

Procedures were carried out in the same manner as in Example 6 except for adding 8 parts by weight of the polycarbonate (e). The formulation ratio and the test results are shown in Table 1 and Table 2.

TABLE 1

| Components added (weight ratio) | Example | | | | | | Comparative example | | |
|---|---|---|---|---|---|---|---|---|---|
|  | 1 | 2 | 3 | 4 | 5 | 6 | 1 | 2 | 3 |
| First hopper |  |  |  |  |  |  |  |  |  |
| PPE (a) |  |  |  |  |  |  |  |  |  |
| (a-1) | — | — | 20 | — | — | — | — | — | — |
| (a-2) | 26 | 26 | — | 5 | 23 | 26 | 26 | 26 | 26 |
| Saturated polyester (b) PBT128 | — | — | — | — | — | 60 | 60 | 60 | — |
| Impact modifier (c) |  |  |  |  |  |  |  |  |  |
| G1651 | 12 | — | — | 10 | 11 | 12 | 12 | 12 | 12 |
| G1652 | — | — | 14 | — | — | — | — | — | — |
| Compatibilizer (d) |  |  |  |  |  |  |  |  |  |
| Hydroxyalkylated PPE | — | — | — | 20 | — | — | — | — | — |
| Kaneka AXE | 2 | 2 | 2 | — | — | 2 | 2 | 2 | 2 |
| BF-1000 | — | — | — | — | 3 | — | — | — | — |
| Polycarbonate (e) H-3000 | 2 | 2 | 2 | 2 | 2 | 2 | — | 8 | 8 |
| Compatibilizing aid Tetrabutylphosphonium bromide | — | — | — | — | — | 0.1 | 0.1 | 0.1 | — |
| Second hopper |  |  |  |  |  |  |  |  |  |
| Saturated polyester (b) PBT128 | 60 | 60 | 64 | 65 | 63 | — | — | — | 60 |
| Impact modifier (c) G1651 | — | 12 | — | — | — | — | — | — | — |
| Compatibilizing aid |  |  |  |  |  |  |  |  |  |
| Tetrabutylphosphonium bromide | 0.1 | 0.1 | 0.1 | — | 0.1 | — | — | — | 0.1 |
| TOT | — | — | — | 0.2 | — | — | — | — | — |

Comparative Example 3

Procedures were carried out in the same manner as in Example 1 except for adding 8 parts by weight of the polycarbonate (e). The formulation ratio and the test results are shown in Table 1 and Table 2.

The respective physical properties and various characteristics were measured and evaluated according to the following methods.

(1) Flexural modulus

Flexural modulus was measured according to ISO R178-1974 Procedure 12 (JIS K 7203) by using an Instron tester.

(2) Izod impact strength

Izod impact strength was measured according to ISO R180-1969 (JIS K 7110) Izod impact strength with notch by using an Izod impact tester manufactured by Toyo Seiki Seisakusho.

(3) Heat distortion temperature

Heat distortion temperature was measured according to JIS K 7207 by using an HDT tester manufactured by Tokyo Seiki Seisakusho with a load of 4.6 kg.

TABLE 2

| Evaluation item | Example | | | | | | Comparative example | | |
|---|---|---|---|---|---|---|---|---|---|
| | 1 | 2 | 3 | 4 | 5 | 6 | 1 | 2 | 3 |
| Flexural modulus 23° C. (kg/cm$^2$) | 19,500 | 19,800 | 18,500 | 20,200 | 19,700 | 19,000 | 19,200 | 19,700 | 19,700 |
| Izod impact strength | | | | | | | | | |
| 23° C. (kg · cm/cm$^2$) | 73 | 65 | 40 | 67 | 60 | 33 | 15 | 12 | 16 |
| −30° C. (kg · cm/cm$^2$) | 12 | 11 | 9 | 11 | 10 | 9 | 6 | 6 | 7 |
| Heat distortion temperature 4.6 kg (°C.) | 163 | 162 | 160 | 165 | 165 | 164 | 166 | 145 | 149 |

From the results of the above evaluation tests, it can be seen that the thermoplastic resin composition of the present invention in which a polycarbonate is formulated at a specific ratio has an improved balance between impact resistance and heat resistance and also excellent rigidity.

EXAMPLES 7 to 10

<Preparation of intermediate composition (A)>

The following respective components were used.

Component (a): PPE

Poly(2,6-dimethyl-1,4-phenylene ether) (intrinsic viscosity measured at 30° C. in chloroform: 0.40 dl/g) produced by way of trial by Nippon Polyether Co. was used.

Component (e): Polycarbonate

A polycarbonate Upiron H-3000 (trade name) produced by Mitsubishi Gas Kagaku Co. was used Component (d): Modified resin (d-1): 100 parts by weight of a commercially available hydrogenated vinyl aromatic-conjugated diene block copolymer Kraton G1651 (trade name, styrene content: 33% by weight) produced by Shell Chemical Co., 5 parts by weight of an epoxidized acrylamide compound Kaneka AXE (trade name) produced by Kanegafuchi Kagaku Kogyo Co. as an epoxy-containing vinyl monomer and 0.1 part by weight of 1,3-bis-(t-butylperoxyisopropyl)benzene Perkadox 14 (trade name, produced by Kayaku AKZO Co.) were sufficiently mixed by stirring using a super mixer. The mixture was melted and kneaded by using a TEX 44 biaxis extruder (trade name) manufactured by Nippon Seikosho Co. under kneading conditions of a setting temperature of 180° C. and a screw rotary number of 200 rpm to prepare a composition. Then, the composition was pelletized. As a result of measuring an infrared absorption spectrum of the modified resin, it was found that the content of the epoxy-containing compound in the graft polymer was 1.5% by weight (the modified resin obtained is referred to as "Modified Kaneka AXE" in Table 3).

(d-2): In the same manner as in (d-1) except for using a methacrylate METHB (trade name) having an alicyclic epoxy group produced by Daiceru Kagaku Kogyo Co. in place of Kaneka AXE, a composition was prepared and pelletized. The pellets were washed with acetone and then dried under reduced pressure to obtain a modified resin. The content of the epoxy-containing compound in the graft polymer measured in the same manner was 1.1% by weight (the modified resin obtained is referred to as "Modified METHB" in Table 3).

Impact modifier (c)

Kraton G1651 (trade name, produced by Shell Chemical Co.) was used.

The components (a), (e), (d) and (c) described above were sufficiently mixed by stirring using a super mixer according to the formulation ratios shown in Table 3. Then, the mixtures were melted and kneaded by using a TEX 44 biaxis extruder (trade name) manufactured by Nippon Seikosho Co. under kneading conditions of a setting temperature of 230° C. and a screw rotary number of 150 rpm prepare compositions. The compositions were pelletized. The pellets were dried at 105° C. for 8 hours by using a hot air dryer to obtain intermediate products.

<Preparation of final resin composition>

(A) Intermediate composition

The intermediate compositions prepared as described above were used.

(b) Saturated polyester

Polybutylene terephthalate (PBT) PBT128 (trade name) produced by Kanebo Co. was used.

As a compatibilizing aid, commercially available tetrabutylphosphonium bromide (produced by Aldrich Co.) was used.

The above components (A) and (b) were sufficiently mixed by stirring using a super mixer according to the formulation ratio as shown in Table 3. Then, the mixtures were melted and kneaded by using a TEX 44 biaxis extruder (trade name) manufactured by Nippon Seikosho Co. under kneading conditions of a setting temperature of 210° C. and a screw rotary number of 150 rpm while maintaining the vent ports located downstream from the first hopper at a pressure of 10 mmHg to prepare compositions. The compositions were pelletized. The pellets were dried at 105° C. for 8 hours by using a hot air dryer.

The respective pellets of the thermoplastic resin compositions obtained were subjected to injection molding by using an inline screw type injection molding machine IS-90B Model (trade name, manufactured by Toshiba Kikai Seisakusho Co.) at a cylinder temperature of 260° C. and a mold cooling temperature of 80° C. to prepare test pieces.

At injection molding, drying was carried out until immediately before injection molding by using a reduced pressure dryer under conditions of 0.1 mmHg and 80° C. for 48 hours. The injection molded test pieces were placed in a desiccator immediately after molding and allowed to stand at 23° C. for 4 to 6 days, and then evaluation tests were conducted. The results are shown in Table 3.

Comparative Examples 4 to 7

In Comparative example 4, a resin composition was prepared by using the same formulation components as in Examples 7 to 10 and the formulation ratio shown in Table 3 and changing preparation steps. That is, in Comparative example 4, a step of preparing an intermediate composition was omitted, and all components including the saturated polyester (b) were formulated when a final composition was prepared. In Comparative examples 5 to 7, resin compositions were prepared by the two steps in the same manner as in Examples 7 to 10 except for using intermediate compositions having different formulation ratios from those of the present invention. In Comparative example 5, an intermediate composition not containing the polycarbonate (e) was used. In Comparative example 6, 6 parts by weight (13.3% by weight based on intermediate composition) of the polycarbonate (e) was added, i.e. the formulation ratio of the intermediate composition exceeded the range of the present invention. In Comparative example 7, an intermediate composition containing no modified resin was used. The results are shown in Table 3.

The evaluation tests were conducted in the same manner as mentioned above.

From the results of the above evaluation tests, it can be understood that the thermoplastic resin composition prepared according to the method of the present invention has an excellent balance between impact resistance and heat resistance, and said composition can be used for various purposes and it can be an industrially useful material.

Thus, said composition can be used for various purposes, and it can be an industrially useful material.

We claim:

1. A thermoplastic resin composition which comprises:

(a) 4 to 95% by weight of a polyphenylene ether;

(b) 95 to 4% by weight of a saturated polyester;

(c) 0.5 to 40% by weight of an impact modifier;

(d) 0.01 to 50% by weight of at least one compatibilizer selected from the group consisting of:

(1) hydroxyalkylated polyphenylene ether;

(2) polyhydroxyphenylene ether having an alcoholic hydroxyl group in the side chain;

(3) a compound represented by the formula:

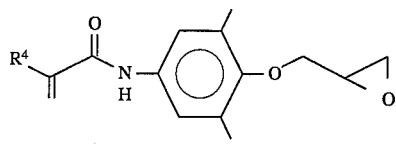

wherein $R^4$ represents a hydrogen atom or a methyl group;

(4) a resin obtained by graft polymerizing a compound represented by the formula:

TABLE 3

| Formulation weight ratio | Example | | | | Comparative example | | | |
|---|---|---|---|---|---|---|---|---|
| | 7 | 8 | 9 | 10 | 4 | 5 | 6 | 7 |
| (A) Intermediate composition | 40 | 40 | 45 | 35 | 0 | 39 | 45 | 40 |
| PPE (a) | (25) | (25) | (33) | (18) | — | (25) | (25) | (25) |
| Polycarbonate (e) H-3000 | (1) | (1) | (2) | (1) | — | — | (6) | (1) |
| Modified resin (d) | | | | | | | | |
| (d-1) Modified Kaneka AXE | (14) | — | (10) | (16) | — | (14) | (14) | — |
| (d-2) Modified METHB | — | (14) | — | — | — | — | — | — |
| Impact modifier (c) | — | — | — | — | — | — | — | (14) |
| Final composition | | | | | | | | |
| PPE (a) | — | — | — | — | 25 | — | — | — |
| Polycarbonate (e) H-3000 | — | — | — | — | 1 | — | — | — |
| Modified resin (d) (d-1) Modified Kaneka AXE | — | — | — | — | 14 | — | — | — |
| Saturated polyester (b) | 60 | 60 | 55 | 65 | 60 | 61 | 55 | 60 |
| Compatibilizing aid | 0.1 | 0.1 | 0.1 | 0.1 | 0.1 | 0.1 | 0.1 | 0.1 |
| Flexural modulus 23° C. (kg/cm$^2$) | 19,000 | 18,500 | 20,500 | 17,500 | 18,700 | 18,500 | 19,300 | 19,800 |
| Izod impact strength | | | | | | | | |
| 23° C. (kg · cm/cm$^2$) | 60 | 50 | 35 | 72 | 12 | 15 | 10 | 5 |
| −30° C. (kg · cm/cm$^2$) | 10 | 8 | 8 | 12 | 5 | 6 | 5 | 2 |
| Heat distortion temperature 4.6 kg (°C.) | 164 | 161 | 168 | 160 | 166 | 169 | 148 | 168 |

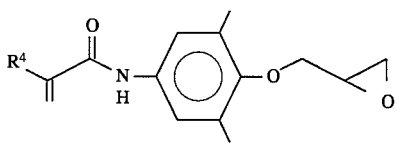

wherein R⁴ represents a hydrogen atom or a methyl group or a compound represented by the formula:

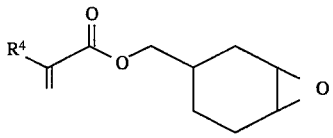

wherein R⁴ represents a hydrogen atom or a methyl group, to a hydrogenated product of a block copolymer comprising a vinyl aromatic compound polymer block and a conjugated diene polymer block; and (e) 0.1 to 3 part by weight of a polycarbonate based on 100 parts by weight of the above (a) to (d) in total.

2. A process for preparing a thermoplastic resin composition which comprises the steps of melting and kneading (A)

(a) 50 to 95% by weight of a polyphenylene ether;

(e) 0.1 to 5% by weight of a polycarbonate;

(d) 5 to 50% by weight of at least one compatibilizer selected from the group consisting of:
(1) hydroxyalkylated polyphenylene ether;
(2) polyhydroxyphenylene ether having an alcoholic hydroxyl group in the side chain; and
(3) a compound represented by the formula:

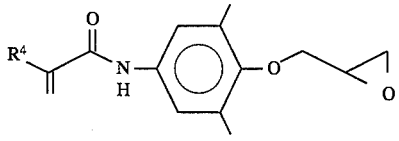

wherein R⁴ represents a hydrogen atom or a methyl group;

(4) a resin obtained by graft polymerizing a compound represented by the formula:

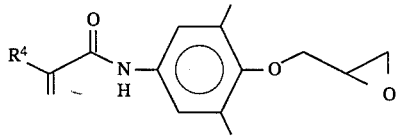

wherein R⁴ represents a hydrogen atom or a methyl group or a compound represented by the formula:

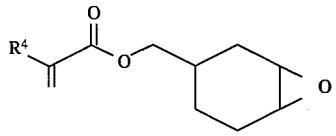

wherein R⁴ represents a hydrogen atom or a methyl group, to a hydrogenated product of a block copolymer comprising a vinyl aromatic compound polymer block and a conjugated diene polymer block; and (c) 0 to 35 % by weight of an impact modifier based on 100 parts by weight of the above (a), (e) and (d) in total to obtain an intermediate composition (A), and then, melting and kneading 10 to 80% by weight of the intermediate composition (A) and (b) 90 to 20% by weight of a saturated polyester in a kneader equipped with vent ports each having a vacuum device while maintaining each vent port at a reduced pressure of 200 mmHg or less to prepare a thermoplastic resin composition.

3. The composition according to claim 1, wherein said composition comprises (a) 5 to 70% by weight of the polyphenylene ether, (b) 90 to 30% by weight of the saturated polyester, (c) 3 to 30% by weight of the impact modifier and (d) 0.5 to 40% by weight of the compatibilizer and (e) 0.5 to 2.5 parts by weight of the polycarbonate based on 100 parts by weight of the above (a) to (d) in total.

4. The composition according to claim 1, wherein said composition comprises (a) 10 to 55% by weight of the polyphenylene ether, (b) 80 to 45% by weight of the saturated polyester, (c) 7 to 20% by weight of the impact modifier and (d) 1 to 35% by weight of the compatibilizer and (e) 1 to 2 parts by weight of the polycarbonate based on 100 parts by weight of the above (a) to (d) in total.

5. The process according to claim 2, which comprises melting and kneading
(A)

(a) 60 to 94% by weight of the polyphenylene ether, (e) 0.5 to 3.5% by weight of the polycarbonate, and (d) 6 to 40% by weight of the compatibilizer and (c) 0.5 to 35 parts by weight of the impact modifier based on 100 parts by weight of the above (a), (e) and (d) in total to obtain an intermediate composition (A), and then, melting and kneading 15 to 75% by weight of the intermediate composition (A) and (b) 85 to 25% by weight of the saturated polyester.

6. The process according to claim 2, which comprises melting and kneading
(A)

(a) 80 to 93% by weight of the polyphenylene ether, (e) 1 to 3% by weight of the polycarbonate, and (d) 7 to 30% by weight of the compatibilizer and (c) 1 to 10 parts by weight of the impact modifier based on 100 parts by weight of the above (a), (e) and (d) in total to obtain an intermediate composition (A), and then, melting and kneading 20 to 65% by weight of the intermediate composition (A) and (b) 80 to 35% by weight of the saturated polyester.

7. The process according to claim 2, wherein the pressure is maintained at 100 mmHg or less.

8. The process according to claim 2, wherein the pressure is maintained at 50 mmHg or less.

9. The composition according to claim 1, wherein said compatibilizer (d) is a compound represented by the formula:

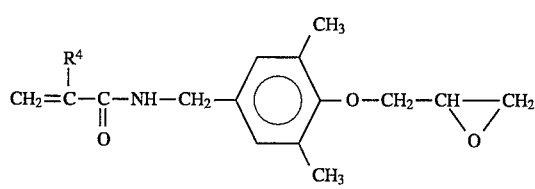
(VII)
wherein R⁴ represents a hydrogen atom or a methyl group.
10. The composition according to claim 1, wherein said polycarbonate (e) has a weight average molecular weight of 5,000 to 30,000.
11. The composition according to claim 1, wherein said polycarbonate (e) has a weight average molecular weight of 8,000 to 20,000.
* * * * *

UNITED STATES PATENT AND TRADEMARK OFFICE
CERTIFICATE OF CORRECTION

PATENT NO.   : 5,496,885
DATED        : March 5, 1996
INVENTOR(S)  : Kiyoji TAKAGI et al.

It is certified that error appears in the above-indentified patent and that said Letters Patent is hereby corrected as shown below:

On the title page, Item [*], the Patent number is incorrect. It should read:

--[*]  Notice:  The term of this patent shall not extend beyond the expiration date of Pat. No. 5,310,776.--

Signed and Sealed this

Fourth Day of June, 1996

BRUCE LEHMAN

Attest:

Attesting Officer

Commissioner of Patents and Trademarks